Aug. 4, 1936.      D. POLLY      2,049,822
APPARATUS FOR BEADING EYELETS
Filed Aug. 13, 1934

D. Polly
INVENTOR

By
Glascock Downing & Seebold
Attys.

Patented Aug. 4, 1936

2,049,822

UNITED STATES PATENT OFFICE 2,049,822

APPARATUS FOR BEADING EYELETS

Daniel Polly, Paris, France, assignor to Société Industrielle de Ferblanterie, Paris, France Application August 13, 1934, Serial No. 739,669
In France June 6, 1934

2 Claims. (Cl. 218—19)

My invention relates to improvements in eyeletting devices in which an eyelet is inserted in a hole in the pieces to be fastened together and then beaded.

Many eyeletting devices are known, but these known devices are generally of the type which are permanently mounted on a support or of the pincer type. This latter type has the drawback that it is impossible to use the device except at or near the edge of the work.

It is an object of the present invention to provide a device which is simple in construction and yet is capable of utility regardless of where the eyelet is to be beaded in the work.

Another object of the present invention is to provide a device whereby eyelets of different sizes may be beaded and also whereby, a beaded eyelet, if damaged, may be removed from the work.

Figure 4:
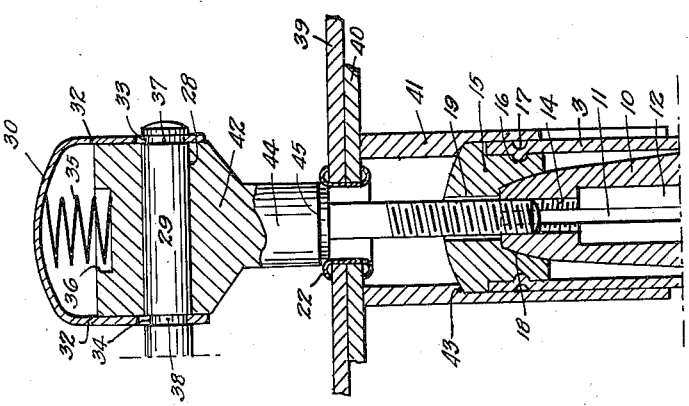
Figure 3:
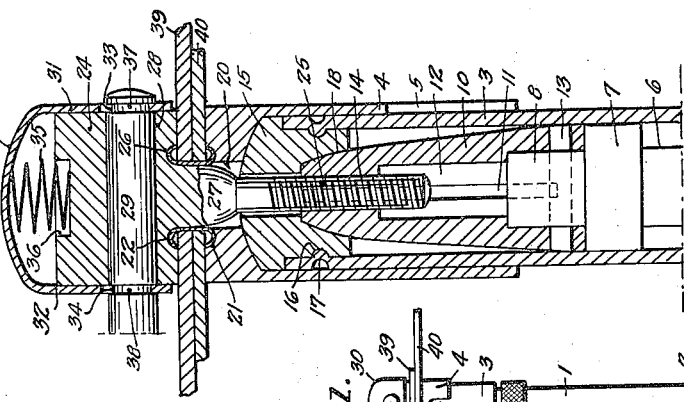
Figure 1:
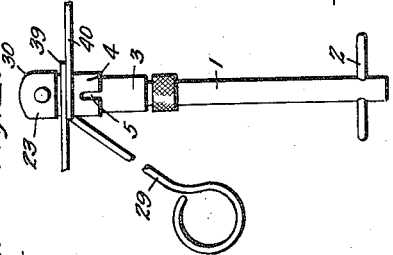
Figure 2:
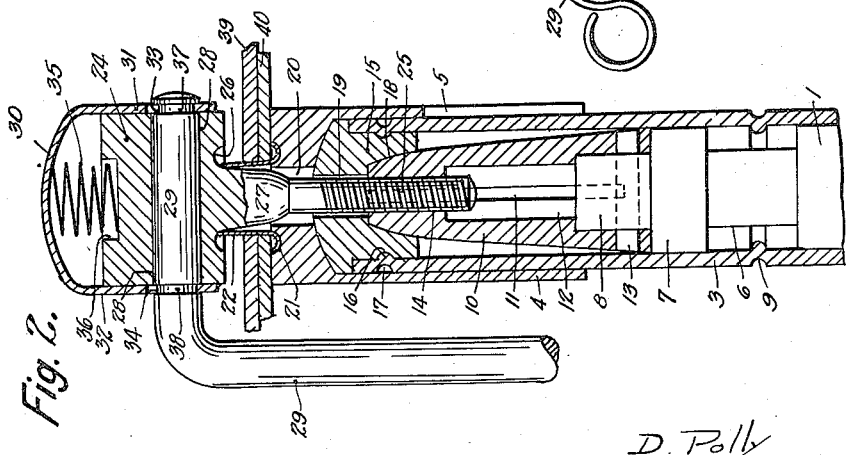

An example of the device will now be particularly described with reference to the accompanying drawing, in which, Figure 1 is an elevational view of the device in working position, Figure 2 is a partial vertical sectional view of the device, Figure 3 is a view of the device as shown in Figure 2, but in which the position of parts is shown after the eyelet has been beaded, and Figure 4 is a partial vertical sectional view of the device when adapted for removing the beaded eyelet.

Similar numerals refer to similar parts throughout the several views.

With reference to Figure 1, the device consists of a nut element and a screw element, respectively, carrying relatively movable eyelet engaging members and handles 2 and 29 which, when manipulated in one direction or the other, cause the two elements to either approach or recede from each other and thereby bead or release the eyelet. The nut element comprises a cylindrical body 1 having a hole in the lower portion thereof to receive the operating member 2; a tubular casing 3 placed about the upper part of the cylindrical body; and a removable sleeve member 4 which is slotted at 5 to secure the sleeve to the tubular casing by a resilient frictional engagement.

In Figures 2 and 3 the lower part of the body 1 has not been shown. The upper portion of this body which is surrounded by the casing 3 is provided with an annular recess 6, a follower portion 7 and an extension 8 of lesser diameter than the follower portion. The casing 3 is slidably secured to the body 1 by the annular indentation 9 which extends into the recess 6 so as to permit a limited sliding movement of the casing with respect to the body. A nut 10, preferably made of brass, and having at least two longitudinal slots 11, diametrically opposite to each other, extending from the top of the nut nearly to the base thereof, fits over the extension 8, and rests against the follower 7. The nut has a hollow portion 12 and is secured to the extension by the pin 13 extending through holes in the nut and extension. The outer surface of the nut is conical, the upper surface having a greater conicity than the lower surface. A threaded hole 14 extends through the upper part of the nut and forms a uniform cylindrical threaded portion when the nut is contracted as hereinafter described.

An anvil 15 having an annular groove 16 is secured within the tubular casing 3 by the annular indentation 17 of the casing which engages the groove 16. The anvil will, therefore, have the same limited sliding movement as the tubular casing which was described above. The anvil has a conical bore 18 in its lower part, the conicity of which corresponds to the conicity of the upper surface of the nut, when the nut has been compressed. The purpose of the conical bore 18 is, as will be seen later, primarily to contract the nut 10. An unthreaded aperture 19, of greater diameter than the threaded hole 14, extends through the anvil.

The removable sleeve member 4 fits over the anvil 15 and engages the casing as stated above. An unthreaded central aperture 20 of greater diameter than the aperture 19 of the anvil, extends through the end of the sleeve and an annular eyelet receiving recess 21 is provided on the upper face of the sleeve surrounding the aperture 20. The eyelet is indicated at 22. It is understood, of course, that the sleeve member 4 may be replaced by another sleeve having an annular recess and aperture of a different size so as to accommodate different sized eyelets.

The screw element indicated at 23 in Figure 1 is composed of a head 24 having a depending screw 25 as shown in Figures 2 and 3, and an annular beading recess 26. At the base of the screw is an enlargement 27 for centering the eyelet when the device is operated. The hole 28 in the head receives the handle member 29. The head 24 is enclosed by a sheet metal cap 30 in the walls 31, 32 of which are holes 33, 34. A spring 35 is arranged between the cap and the head and rests in the recess 36 provided in the head. The handle member has two annular grooves 37, 38 spaced apart a distance equal to the distance between the apertures 33 and 34 of the cap with which the grooves cooperate.

The operation of the device is as follows: the screw 25 is placed through the perforated pieces 39, 40 which are to be fastened together and an eyelet 22 is pushed onto the screw to the position shown in Figure 2. The nut element is then pushed onto the screw which passes freely through the apertures 19 and 20. The screw will also pass freely between the parts of the slotted nut 10 until the upper conical surface of the nut engages the conical bore 18 of the anvil when the nut will be contracted and into threaded engagement with the screw. The operating member 2 is then turned so as to draw the annular eyelet receiving recess 21 and the annular beading recess 26 together, thereby forcing the eyelet 22 against the recess 26 to form a bead. Figure 3 shows the position of the various parts after the eyelet has been beaded.

For removing the device from the work it is sufficient to unscrew the nut element a few turns so as to disengage the nut 10 from the screw 25.

It is, of course, possible to use a non-slotted nut in place of the nut 10 but this would necessitate screwing the nut element the entire distance up the screw thereby causing a retardation of the operation of the device.

If it is desired to replace the sleeve member 4, as stated above, it will, of course, be necessary to replace the head 24 with another head having an annular beading recess which will cooperate with the eyelet receiving recess of the new sleeve member.

To remove the head 24, the cap 30 is depressed so as to disengage the grooves 37 and 38 from the apertures 33 and 34. The handle 29 is then removed from the head and cap thus freeing the head.

To re-assemble the parts of the screw element, the cap 30 is placed over the head 24 or other selected head after the spring 35 has been inserted and then depressed against the action of the spring until the holes 33, 34 are in alignment with the hole 28. The handle member is inserted through the holes until the grooves 37, 38 are opposite the walls 31, 32 of the cap. The cap is then released and the wall portions adjacent the handle snap into engagement with the grooves by the action of the spring. The handle member is thereby held in position.

With reference to Figure 4 which shows the device adapted for removing an eyelet which has been previously beaded, the removable sleeve member 4 has been replaced by the sleeve 41 and the head 24 has been replaced by the cutting element 42. The upper portion of the sleeve 41 has an inner diameter greater than the eyelet 22 and, therefore, bears against the pieces 39, 40 and not the eyelet. This sleeve 41 bears against the anvil 15 by virtue of the shoulder 43. The cutting element 42 comprises a smooth cylindrical portion 44, the diameter of which is the same as the holes in the pieces 39, 40, and which has a sharp edge 45, for cutting the eyelet.

When it is desired to remove an eyelet the device is operated as described above, but when the nut engages the screw and draws the sleeve 41 and the head 42 together, the edge 45 with increasing pressure bears against the beaded portion of the eyelet 22 until it is cut through.

The device is then removed in the same manner as after the beading operation and the eyelet may be easily withdrawn from the perforations in the pieces 39, 40.

What I claim is:—

1. In an eyeletting device, the combination of a tubular casing, with an anvil seated in the upper end of the casing, said anvil having an aperture in axial alinement with a conical boring entering the under side of said anvil, a follower slidable in the lower part of the tubular casing, a longitudinally split nut mounted on the upper end of the follower and having a conical upper end to enter the conical boring of said anvil to close the split nut when the latter is forced inwardly by the follower; and a screw-element comprising a head and a screw to pass through the aperture of said anvil to engage the split nut when the latter is closed, means for supporting the work between the head of the screw-element and the anvil, a handle rod extending horizontally through the head of the screw-element to move the screw-element to and from the work, a cap on the head of the screw-element and engaging the handle rod on opposite sides of said head, and a spring under compression interposed between the cap and the head of the screw-element to maintain a frictional engagement between the handle rod and the head of the screw-element.

2. In an eyeletting device, the combination of a tubular casing, with an anvil seated in the upper end of the casing, said anvil having an aperture in axial alinement with a conical boring entering the under side of the anvil, a follower slidable in the lower part of the tubular casing, a longitudinally split nut mounted on the upper part of the follower and having a conical upper end to enter the conical boring of said anvil to close the split nut when the latter is forced inwardly by the follower; and a screw-element comprising a head and a screw to pass through the aperture of the anvil to engage the split nut when the latter is closed; a sleeve of different area from the anvil removably mounted on the upper end of the tubular casing to extend over the anvil, a handle rod extending horizontally through the head of the screw-element to move the screw-element to and from the work positioned on the sleeve, a cap on the head of the screw-element and engaging the handle rod on opposite sides of said head, and a spring under compression interposed between the cap and the head of the screw-element to maintain a frictional engagement between the handle and the head of the screw-element.

DANIEL POLLY.